INVENTOR.
MURRAY G. CROSBY

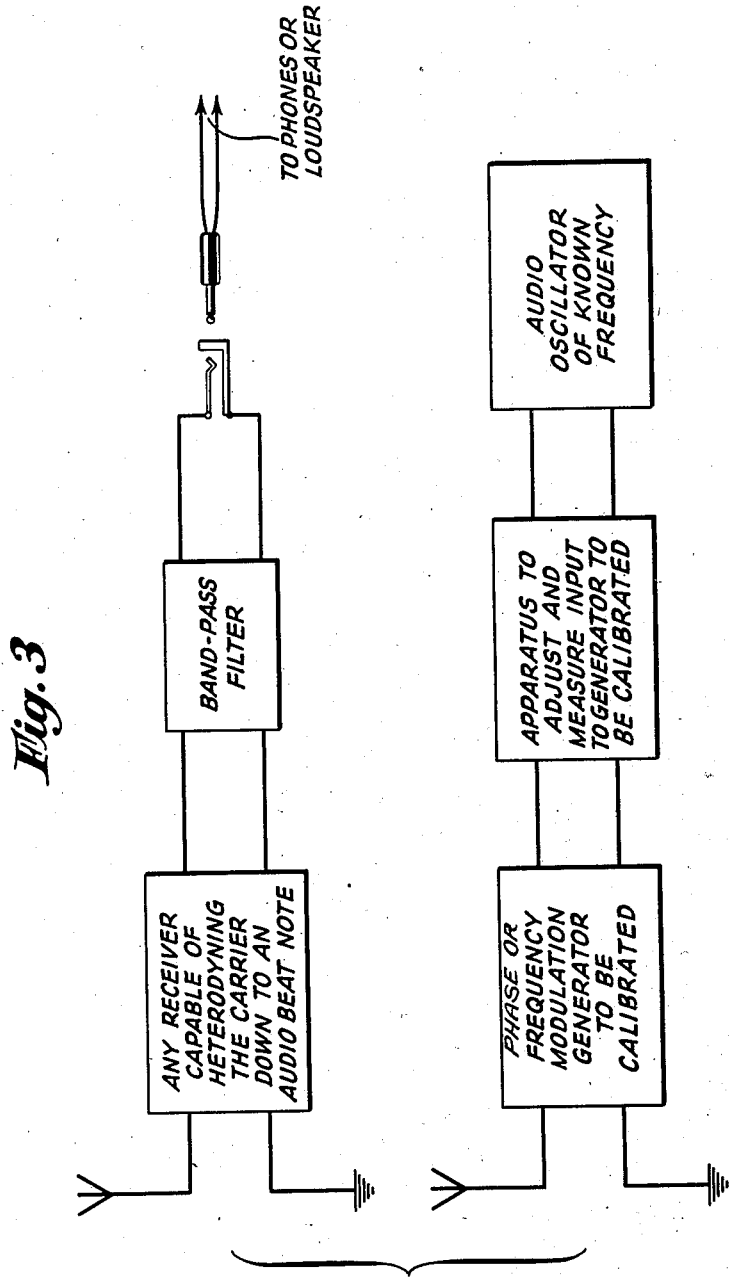

Patented Aug. 11, 1942

2,293,022

UNITED STATES PATENT OFFICE 2,293,022

MEASUREMENT OF DEVIATION OF FREQUENCY OR PHASE

Murray G. Crosby, Riverhead, N. Y., assignor to Radio Corporation of America, a corporation of Delaware Application March 22, 1940, Serial No. 325,274

12 Claims. (Cl. 179—171.5)

My present invention has as its main object to provide an improved system for measuring frequency deviation and for calibrating frequency modulated oscillators or transmitters. A further object of my invention is to provide a system for measuring phase deviation and to calibrate phase modulated transmitters.

Further objects, advantages and features of my present invention will be apparent from the following more detailed specification taken in connection with the accompanying drawings, wherein Figure 1 is a graph showing the variation of the amplitudes of the carrier and side frequencies of a frequency or phase modulated wave as the modulation index or phase deviation, respectively is varied. It will be noted that these Bessel functions, which give the carrier and side-band amplitudes, are quite similar to the ordinary sine and cosine functions. Thus, instead of having sin X and determining the value of sin X from a table of sine and cosine functions, we have $J_n(X)$ and use a table of Bessel functions;

Fig. 3 illustrates apparatus used to measure frequency or phase deviation by the carrier zero method.

Figure 1:
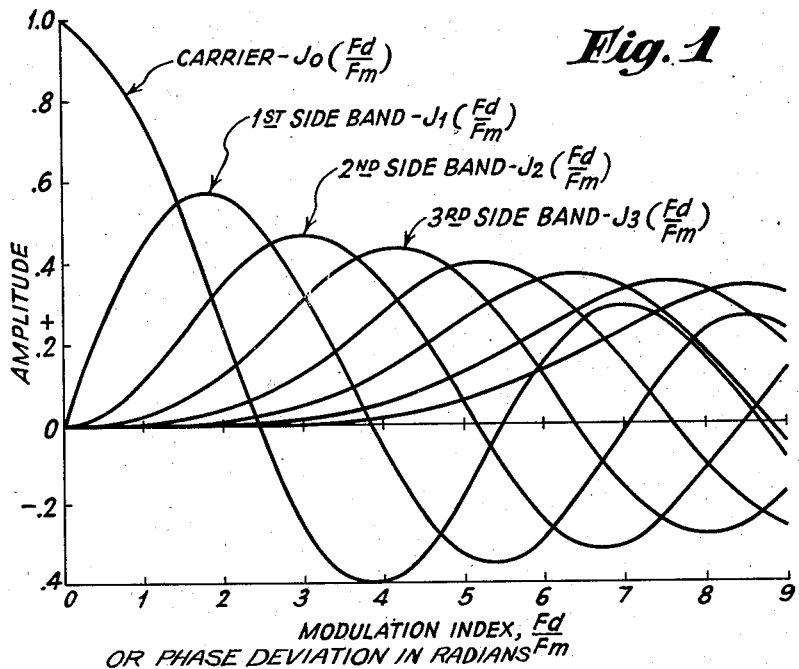

The method of measuring frequency deviation about to be described here has been used extensively by the writer in measuring frequency and phase deviations, and is believed by him to be the simplest and most reliable of any system used. The method is based upon the amplitude characteristic of the carrier in a frequency modulated wave when a single sinusoidal modulating wave is applied. It is well known that the amplitudes of the carrier and side frequencies of a frequency modulated wave vary according to Bessel functions as shown in Fig. 1. The carrier amplitude is proportional to the zero-order Bessel function, $J_0(F_d/F_m)$, where $F_d$ is the peak frequency deviation, $F_m$ is the modulating frequency, and the ratio $F_d/F_m$ is called the modulation index. The ratio $F_d/F_m$ which has been called the modulation index, also represents the phase deviation of the modulated wave in case the wave is considered from the point of view of phase modulation. The frequency deviation concerned in this case is the amount the frequency varies away from the unmodulated carrier frequency on one side, and would be one-half the total excursion of the wave The total excursion is sometimes called the "swing".

The first side frequency is proportional to the first-order Bessel function, $J_1(F_d/F_m)$, the second side frequency is proportional to the second-order function, $J_2(F_d/F_m)$, and so on. As an example, if the frequency deviation is 10,000 cycles and the applied modulating frequency has a frequency of 5,000 cycles, the modulation index would be equal to 2. For this index, the carrier has an amplitude of 0.224 time the amplitude of the unmodulated carrier (see Fig. 1). The first side frequencies have an amplitude of 0.577 time, and so on.

Figure 2:
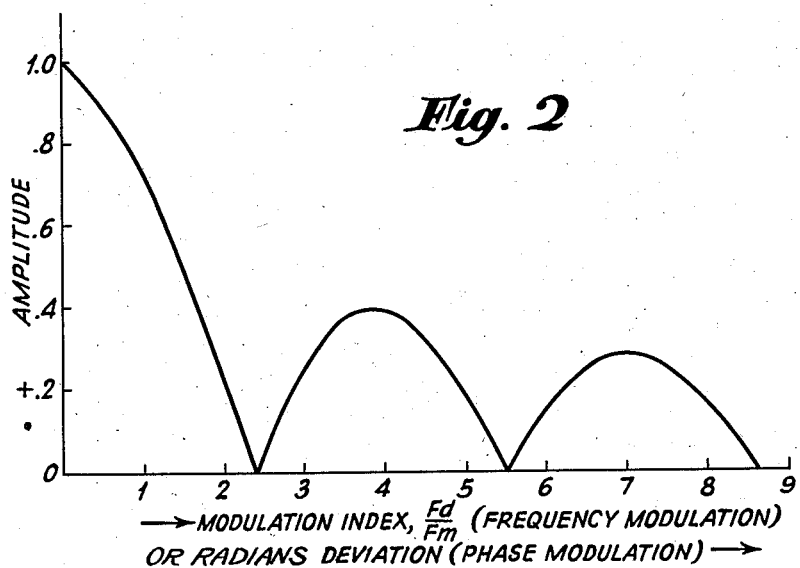
Fig. 2 is a graph showing the variation of the amplitude of the carrier alone as the modulation index (or phase deviation) is varied. The reversals in sign indicated in Fig. 1 are disregarded in order to more clearly picture the amplitude characteristic of the carrier as the modulation index (or phase deviation) is varied.

For measurement of phase deviation the procedure is even simpler, for if at any modulation frequency the modulation level is increased until the carrier first vanishes, the phase deviation is seen from Fig. 2 to be 2.405 radians. A further increase of modulation level to bring the carrier again to zero corresponds to 5.52 radians, and so on.

Fig. 2 shows how the amplitude of the carrier varies as the modulation index is varied when the reversals of sign are disregarded. It will be noted that the carrier has unit amplitude when the index is zero ($F_d=0$). As the index is increased, either by increasing $F_d$ or decreasing $F_m$, the carrier amplitude decreases and becomes zero when the index has the value 2.405, 5.52, 8.654, etc. It can be seen that if a method of detecting these zero points is available, each point furnishes an ideal calibration point if the frequency of the modulating tone is known. For instance, if a 1,000 cycle modulating tone is applied and modulation increased until the carrier is at the first zero point, it will be known that the frequency deviation is 2,405 cycles. This follows since it is known that for this condition the modulation index, $F_d/F_m$, is equal to 2.405. Then $F_d=2.405$ times 1,000 or 2,405 cycles. Likewise at the second minimum the deviation will be 5,520 cycles for this case of a 1,000 cycle modulating tone. If the modulating tone were increased to 2,000 cycles, the first zero point will indicate a frequency deviation of 4,810 cycles, the second 11,040 cycles, and so on. Thus, the modulation frequency may be varied to obtain the frequency deviation at a modulation input level which would not normally produce a carrier zero.

Fig. 3 shows a diagram of the apparatus required for the detection of the carrier zeros. The unmodulated carrier is tuned in on a receiver which has a beating oscillator capable of heterodyning the carrier to an audio beat note. This beat note is passed through an audio filter which removes the side bands of the wave from the frequency modulation generator being calibrated. For instance, if the modulating tone were 1,000 cycles, the filter would be something less than 2,000 cycles wide so as to remove the side bands spaced from either side of the carrier by 1,000 cycles. The indicator at the output of the filter may be headphones or a loud-speaker.

The measurement procedure consists of the recording of the modulation input levels which correspond to the carrier minimums. The unmodulated carrier is first tuned through the audio filter to give maximum output in the phones or loud-speaker. Modulation is then applied until the first carrier zero is obtained. At this point the frequency deviation is equal to 2.405 times the frequency of the modulating tone. Increasing the modulation still further produces the second minimum at which point the frequency deviation is equal to 5.52 times the frequency of the modulating tone. The following is a list of the modulation indexes obtained at the carrier zeros as determined from a Bessel function table:

| Zero: | Index | Zero: | Index |
|---|---|---|---|
| 1 | 2.405 | 6 | 18.071 |
| 2 | 5.520 | 7 | 21.212 |
| 3 | 8.654 | 8 | 24.353 |
| 4 | 11.792 | 9 | 27.494 |
| 5 | 14.931 | 10 | 30.635 |

It will be noted that the first zero differs from the second by an amount equal to 3.115 which is almost equal to 3.1416 or $\pi$. This difference approaches $\pi$ for the higher zeros and for practical usage in measuring deviation may be taken as equal to $\pi$ (with an error of less than 0.5 per cent).

The band-pass filter does not have very rigid requirements. A selectivity about equal to that obtainable with a single audio tuned circuit has been found to be sufficient and the author has successfully observed the zeros with the aid of the natural resonance of a poor pair of headphones. By using a high modulation frequency, the receiver itself can be depended upon to remove the side bands sufficiently. It is usually the lower modulation frequencies which require the highest selectivity.

It may be found that the carrier shifts out of the filter as the modulation is applied. When this occurs the modulation must be raised slowly and the receiver carefully tuned to follow the shift. Apparently a small amount of this shift may occur with a modulator which gives low distortion otherwise.

It is apparent that one of the side bands may be tuned in and the zero points of it observed. The zero points of the side bands will, of course, be different than those of the carrier and will have to be obtained from the Bessel function tables. However, use of the side bands allows the possibility of getting the wrong side band and there is also the possibility of asymmetrical modulation, due to concomitant amplitude modulation, effecting the reading. Likewise the carrier maximums or side band maximums may be used, but, of course, the setting for the minimums may be done with a higher degree of accuracy.

In carrying the invention into effect the input to the frequency modulated generator or transmitter to be calibrated is measured and the value of the input for which the carrier drops to zero, or for which the beat goes to zero, is noted. The input is then increased and the value of transmitter input for the second zero point is noted. From Fig. 2 these zero points in terms of modulation indexes may be plotted against transmitter input and a line drawn between the points. Consequently from what has gone on before intermediate points may be interpolated and/or exterpolated so that for any value of input to the transmitter the modulation index may be determined. By multiplying the modulation index by the oscillator audio frequency the deviation in frequency and variations in input to the transmitter can be computed. Of course, if desired, frequency deviation, rather than index may be plotted against input so that the deviation may be read off directly.

In the case of phase modulation the procedure is the same, it being noted that in this case the abscissa of Figs. 1 and 2 would represent the phase deviation in radians.

It will be apparent to those skilled in the art that the use of an audio beat note is not strictly necessary since an indication of the relative amplitude of the carrier with modulation is all that is necessary. Thus, the step of heterodyning may be eliminated and the output of a radio frequency filter, tuned to the carrier frequency, observed. Also the heterodyning step may be employed to produce an intermediate frequency which is fed to a filter whose output is observed for the carrier zero points.

Having thus described my invention, I claim:

1. The method of calibrating frequency modulation apparatus which includes, generating oscillations of known frequency, applying energy of the generated oscillations to the frequency modulation apparatus to cause frequency modulation of the carrier therein, heterodyning waves from the frequency modulation apparatus to produce an audio beat note, adjusting the amount of frequency modulation until the audio beat note disappears and producing indications of the amplitude of the generated oscillations applied to the frequency modulation apparatus required to cause disappearance of the audio beat note.

2. The method of calibrating a frequency modulated transmitter which includes the steps of generating audio oscillations of known frequency, frequency modulating said transmitter in accordance with said generated oscillations, heterodyning waves from said modulated transmitter to an audio beat note, isolating said audio beat note, varying the amplitude of said audio oscillations used to frequency modulated said transmitter until the audio beat note disappears and indicating the amplitude of the generated oscillations used to modulate said transmitter which causes such disappearance, repeating the process for a different value of generated wave input to said transmitter and indicating again the amplitude of the input which causes disappearance of said beat note.

3. In combination, an audio oscillator of known frequency and variable output, a carrier wave generator coupled to said oscillator and modulated as to frequency by the audio oscillations, a heterodyne receiver receiving waves from said frequency modulated carrier wave generator, said receiver being capable of heterodyning waves from said frequency modulated carrier wave generator or transmitter down to an audio beat note and a band-pass filter coupled to said receiver for passing a predetermined frequency band including the frequency of said beat note.

4. The method of calibrating phase modulation apparatus which includes generating oscillations of known frequency, applying energy of the generated oscillations to the phase modulation apparatus to cause phase modulation of wave energy therein, heterodyning wave energy from the phase modulation apparatus to produce an audio beat note, adjusting the amount of phase modulation until the audio beat note disappears and producing indications of the amplitude of the generated oscillations applied to the phase modulation apparatus to cause disappearance of said audio beat note.

5. The method of calibrating a phase modulation transmitter which includes the steps of generating oscillations of known frequency, applying said generated oscillations to said phase modulation apparatus to modulate a carrier wave therein in accordance with said generated oscillations, heterodyning waves from said transmitter to provide energy of an audio beat note frequency, isolating energy of said audio beat note frequency, varying the amplitude of the oscillations applied to said phase modulation transmitter until the said energy of audio beat note frequency substantially disappears and producing indications of the amplitude of the input to the transmitter which causes such disappearance, repeating the process for a higher value of generated oscillations and again producing indications of the amplitude of the input to said transmitter which causes disappearance of said energy of said beat note frequency.

6. In combination, an audio oscillator of known frequency and variable output, a phase modulated generator or transmitter connected thereto, a receiver receiving waves from said phase modulated generator, said receiver being capable of heterodyning waves from said phase modulated generator or transmitter down to an audio beat note, a band-pass filter coupled to said filter for passing a predetermined frequency and means for indicating the amplitude of the energy passed by said band-pass filter.

7. The method of analyzing a wave the length of which is modulated in accordance with modulation potentials which includes the following steps, increasing from zero the amplitude of the modulation potential, indicating the successive values of modulation potential at which selected components of said wave vanish, and coordinating said potentials at which the said components vanish with successive values of phase deviation in radians whose zero order Bessel function is zero.

8. The method of analyzing a wave the length of which is modulated in accordance with modulation potentials which includes the following steps, increasing from zero the amplitude of the modulation potential, indicating the successive values of modulation potential at which the carrier vanishes, and coordinating said potentials at which said carrier vanishes with successive values of phase deviation in radians whose zero order Bessel function is zero.

9. The method of calibrating the modulation characteristic of apparatus producing wave energy modulated as to its timing by potentials, which comprises modulating said wave by a sinusoidal potential, increasing the intensity of said potential from zero to a value at which selected components of said wave vanishes, and coordinating said intensity with the degree of timing modulation represented by a phase deviation of 2.405 radians.

10. The method of analyzing a wave the length of which is modulated in accordance with modulation potentials which includes the following steps, increasing from zero the amplitude of the modulating potential, indicating the successive values of modulation potential at which the carrier component vanishes, coordinating said potentials at which the carrier vanishes with successive values of phase deviation in radians whose zero order Bessel function is zero and deriving said deviation in radians and the frequency of the modulating potentials the frequency deviation for said successive values of phase deviation.

11. The method of calibrating the modulation characteristic of a wave of known frequency modulated as to its timing by signal voltages, which comprises modulating said wave by a sinusoidal modulation voltage of an intensity increasing from zero to a value at which the carrier component of said wave vanishes, and coordinating the intensity of said modulation voltage at which the carrier vanishes with the degree of timing modulation of said wave represented by a phase deviation of 2.405 radians, further increasing said modulation voltage to additional values at which said carrier vanishes, and coordinating the successive intensity values at which the carrier vanishes with the degrees of timing modulation represented by phase deviations of 5.520 radians, etc., each successive figure being greater than the preceding by approximately 3.1416 radians.

12. A method as recited in claim 11 including the step of, deriving from the modulation voltage frequency and the successive radians deviation at which the carrier vanishes the frequency deviations produced by the corresponding values of modulation voltage intensities.

MURRAY G. CROSBY.